Oct. 6, 1953  C. G. HARFORD ET AL  2,654,136
METHOD OF MAKING LIGHTWEIGHT AGGREGATE
Filed Feb. 23, 1950
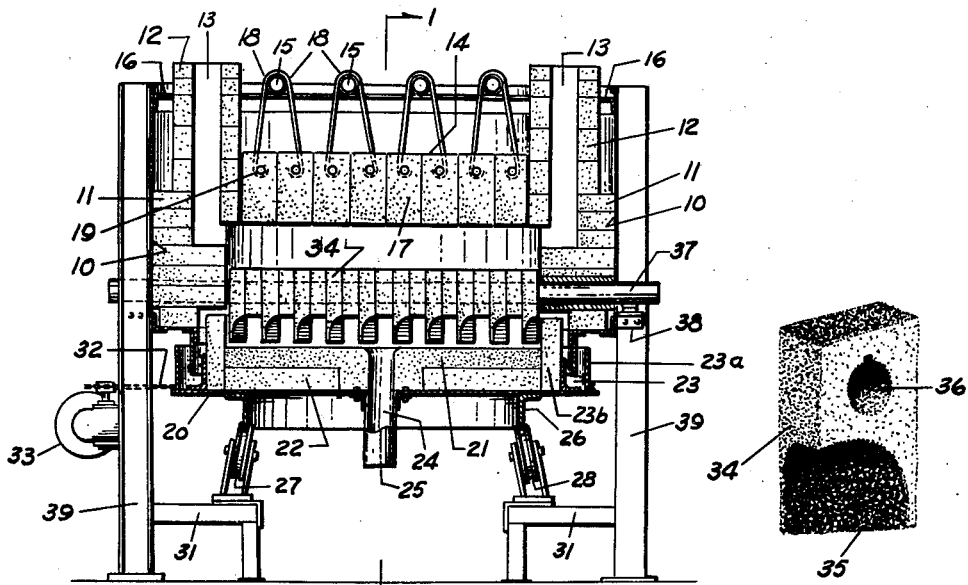
FIG. 1
FIG. 3
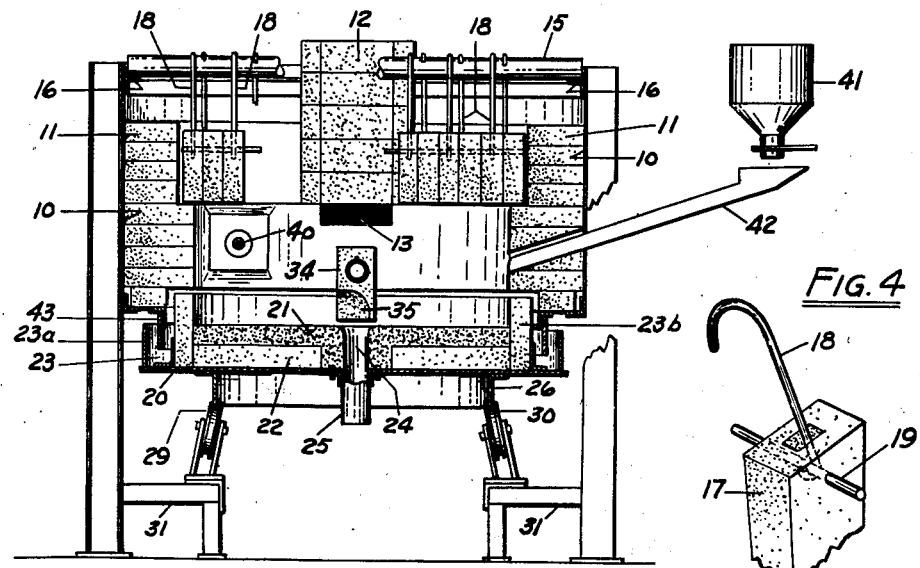
FIG. 2
FIG. 4
CHARLES G. HARFORD
EKKEHARD L. KREIDL   INVENTORS
JOSEPH L. UTTER
BY Alfred R. Johnson Patented Oct. 6, 1953

2,654,136

UNITED STATES PATENT OFFICE 2,654,136

METHOD OF MAKING LIGHTWEIGHT AGGREGATE

Charles G. Harford, Wollaston, Ekkehard L. Kreidl, Boston, and Joseph L. Utter, Stoughton, Mass., assignors to Arthur D. Little, Inc., Cambridge, Mass., a corporation of Massachusetts Application February 23, 1950, Serial No. 145,694

12 Claims. (Cl. 25—156)

1

This invention relates to an improved method for making light-weight aggregate materials from clays, shales, and similar clay-like siliceous materials.

Lightweight aggregate is commercially available in bulk densities ranging all the way from 4 to 80 lbs./cu. ft. The heavier types are used primarily in the preparation of load bearing concrete, lighter ones are used in concretes such as used for roof decks and floor fills, and the lightest ones in plasters and mortars of all kinds. Most of the available expanded clay-like materials are used in the preparation of heavier type lightweight aggregates and are commonly prepared by sintering a mass of clay to which some fuel such as powdered coal or coke has been added. The resulting bloated sheets or mass is crushed to the desired particle size distribution to be used in a similar manner as cinder or expanded slags.

Attempts have been made to improve these materials by pre-shaping the aggregate as by extrusion, and then expanding them in a rotary kiln. One of the difficulties encountered in preparing lightweight aggregate from pre-shaped clay-like materials is the fact that during the bloating the materials become sticky and have a tendency to agglomerate. To obviate this difficulty, pre-shaped particles of clay-like materials have been coated with a refractory material such as sand or refractory clays, or, where particularly small particles are to be bloated, with diatomaceous earth. For this process, it has also been suggested to use a slight excess of the coating material necessary to just coat the pellets and to include in the firing operation about 4–8% by weight of the coating material. While the product is improved, difficulty with uneven firing is still experienced resulting in uneven expansion.

None of these methods is fully satisfactory for making extremely lightweight aggregates from clays or other siliceous materials capable of being bloated, i. e., materials which will have a bulk density of less than 30 lbs./cu. ft., and in particular as low as 10 to 30 lbs./cu. ft.

It is an object of this invention to prepare lightweight aggregate from preformed clay-like siliceous materials.

A further object is to prepare lightweight aggregate from such materials having a bulk density as low as 10 to 30 lbs./cu. ft.

Still another object is to prepare evenly expanded preformed clay-like siliceous materials.

These and other objects which will become apparent may be accomplished by enveloping the preformed clay-like material with at least an equal volume of finely divided non-reactive refractory blanketing material during the firing operation.

As raw materials for forming the lightweight aggregate, clays and other clay-like materials such as shales and slates may be used. In actual operation it has been found that clay is preferred because of its easy workability and availability. Clays, shales, and slates vary somewhat in their composition and allowances must be made accordingly as hereinafter set forth.

Clays and shales, in particular, often contain natural bloating agents in sufficient quantity to expand the product properly. If these bloating agents are not naturally sufficient, or where extreme lightweight aggregate is desired, bloating agents such as carbonates, iron oxide, oils, tars and other hydrocarbons, finely ground coal, sulfides and other materials known in the art to be bloating agents may be used. The amount of bloating agent added depends, of course, upon the condition of the clay-like material to be bloated. We prefer to use about 2% to 4% by weight of such agent for clays, while some shales and slate require more. Bunker C oil, or similar hydrocarbon material, is the preferred bloating agent.

The refractory blanketing material must be finely divided and substantially non-reactive with the clay-like material at the temperatures employed. The temperature necessary to bloat the clay should, of course, be insufficient to soften the blanketing material. Sand, graphite, refractory clay, or burned limestone of proper particle size are suitable blanketing agents.

In carrying out our process the clay is prepared by reducing it to a finely divided state, mixing it with the bloating agent, if necessary, and with suitable amounts of water to impart sufficient plasticity, and shaping it into individual particles as by extrusion and division into desired lengths. Exact preshaping of the particles is, however, unnecessary and it is sufficient to break up the clay into particle sizes correspondingly smaller than the desired bloated size. The size of the particles will therefore vary considerably but generally it is preferred that they have a size distribution such that when bloated will yield lightweight aggregate conforming to the prevailing specifications in the industry.

In the preparation of shales it is necessary only to roughly size the shale. Those shales which do not naturally bloat, however, must be reduced to a fine powder and mixed with a bloating agent before shaping. Slate may be prepared similarly to a non-bloating shale by reducing it to a fine powder, mixing it with a bloating agent and shaping.

The shaped material is mixed with at least an equal volume of blanket material in any suitable manner. Preferably, however, the mixture should contain at least two volumes of blanketing agent to one volume of particles to be bloated. The upper limit is indicated by the economy of the process, but is seldom more than five times the volume of prepared clay.

This mixture then is introduced into a furnace such as a rotary furnace or preferably a rotating hearth or rabbling furnace in which the mixture of shaped clay and blanketing agent is turned over by means of a rabbling device.

The purpose of the rabbling device is that in the practice of our invention we have found that it is advisable to stir the mixture of bloating material and blanketing material during the course of firing. Such stirring insures better heat distribution and thus allows heavier furnace loads and/or shorter in-furnace time.

A convenient method, as indicated above, for stirring the mixture is to employ a rotary kiln; another method, and one we have found most effective, is to fire the bloating material in a rabble furnace wherein the rabble teeth continuously rake the mixture. The bloating material and blanketing material may be introduced into the furnace separately or mixed. The fall to the bottom of the furnace where they are plowed or raked by the rabble teeth continually and gradually forced across the floor and out of the furnace. By appropriate spacing of the rabble teeth together with the rotating hearth or floor, the mixture is caused to move in a path which is helical in nature. Such an arrangement provides a convenient means for mixing and eliminating the material. A detailed description of a rabbling furnace appears below. The temperature and time in the furnace, of course, will be determined by the exact nature of the material, but for most clay-like materials, temperatures between 1900 and 2400° F. will be satisfactory, and in-furnace times of about 10 minutes or longer will be required. The mass then is discharged from the furnace and the bloated material separated from the blanketing material by screening or by cyclone method. Any other equivalent method is also satisfactory. In the accompanying drawings:

Fig. 1 is a front elevation of a rotating hearth rabble furnace.

Fig. 2 is a side elevation of the furnace shown in Fig. 1 taken on line 1—1.

Fig. 3 is a refractory rabble tooth.

Fig. 4 is a section of the roof and support device.

The furnace consists of a cylindrical sheet steel shell 10, enclosing the brick work of the furnace. The brick work forms the sides 11 and the two flues 12 with openings 13. A removable roof 14 is of brick and is suspended by an assembly consisting of four main support bars 15 supported by brackets 16 attached to steel shell 10. Insulating fire bricks 17 employed on roof 14 are supported by support members 18 as shown in detail in Fig. 4. Support members 18 hook over main support bars 15 and under brick support rods 19. The roof may be removed by any suitable means not shown.

The hearth consists of a steel plate 20 which supports the refractory brick made of hard, dense fire brick 21 on the surface an insulating brick 22 underneath, both being arranged within a circular channel 23 formed by an outer circular steel rim 23a and an inner refractory rim 23b which rest on and are attached to the periphery of hearth steel plate 20 to provide a space for a sand seal. An upper circular stationary lip 43 extends down between rims 23a and 23b as a part of the seal. Hearth steel plate 20 has a center opening 24 to which is attached discharge means 25.

Attached to the bottom of plate 20 is circular rail 26 which rides in sheaves 27, 28, 29, 30. The sheaves are supported by suitable brackets 31.

The hearth 20 is rotated on the sheaves 27, 28, 29, and 30 by means of chain 32 driven by driving unit 33.

Rabble teeth 34 made of refractory brick, are formed with a suitable diagonal blade 35 and provided with keyway holes 36 as shown in Fig. 3. The teeth are supported by rabble arm 37 which is in the form of a pipe with a key rod which conforms with keyway holes 36, and supported by brackets 38, attached to legs 39.

Set in the refractory wall 11 are burners 40, of which only one of two is shown.

The feeder device consists of hopper 41 and chute 42 passing through the fire brick wall 11 and steel shell 10.

In the operation of the furnace the pellet-blanket mixture is placed in hopper 41 and fed into the furnace by chute 42, from which it drops on the outer periphery of the rotating hearth. The burners 40 are adjusted to provide the proper heat. The outside rabble tooth plows the pellet-blanket mixture to the outside and staggered tooth on the opposite side and the action is repeated by similarly staggered position of the teeth until the mixture is pushed out at center hole through discharge means 25. The relative motion of the rotating hearth and rabble teeth serve to turn over and pass the pellet-blanket mixture continuously through the furnace at a regulated speed. If desired, material can be loaded at the center and discharged at the periphery by having rabble teeth with a pitch opposite to the one shown in Fig. 3.

The mechanism of the formation of lightweight aggregate by bloating argillaceous or clay-like materials is believed to be brought about by a combination of factors. Clays often contain some organic material, and if the amount is insufficient, material may be added either of an organic nature or inorganic material which upon heating will decompose with evolution of gas. When heated sufficiently, clays soften and become plastic, and the organic or other matter decomposes to release gas. The gas bubbles blow up or bloat the plastic clay to form a vesicular mass, which upon cooling forms a lightweight aggregate. It is, therefore, essential that the clay be heated uniformly to produce aggregate of minimum density. It is evident that overheating will collapse the bloated clay because of its excessive plasticity, and that underheating will fail either to decompose the gas forming material or to cause the clay to become sufficiently plastic to expand properly. But uniform heating is not readily attained, especially when a considerable number of small shaped particles is concerned. There is also the problem of sticking of the shaped pieces together when they are in the plastic shape. By providing a mass of finely divided high melting material which surrounds each individual shaped particle and which substantially fills the voids between them, even and uniform distribution of heat is enhanced in addition to eliminating the problem of sticking together of the bloated particles. Maximum and uniform expansion without danger of partial collapse thereby results. It is believed that such a blanketing agent has the advantage of equalizing any lack of uniformity in heating in the bloating furnace, thus minimizing the sensitivity of the material to be bloated with respect to exact firing control. In any case, it is found that by firing the preshaped materials in a blanket, temperature control is no longer as critical. It is also found that by using such blanketing agents, lightweight aggregate can be formed from individual particles in densities as low as 8 lbs./cu. ft. whereas without the use of a blanket, the lowest density giving a uniform and useful material which can be readily obtained is about 30 lbs./cu. ft. or more.

The separation of blanketing material from bloated aggregate may or may not be carried out as desired. It is usually desired to separate the two materials and this is not too difficult by gravitational means or by sieving, because the separating blanket material is not softened, and does not itself stick to the bloated particles to any objectionable degree.

In order to set forth my invention more clearly, the following procedure for making lightweight aggregate is given.

Clay was mixed with 2% oil and enough make-up water to bring the water content to about 25%. The mixture was extruded through a die having ⅛" openings and the extruded material cut into about ⅛" lengths. 100 lbs. of this mixture then was mixed with 200 lbs. of fine sand and charged into a rotary hearth furnace, such as described above, wherein the material is stirred by passing along a series of suitably arranged rabble teeth with an average in-furnace time of about 25 minutes. Since the blotting temperature of the clay was around 2100° F., the temperature of the furnace was adjusted to this temperature. The material discharged from the furnace showed an average bulk density of about 15 lbs./cu. ft. Replacing sand with burned limestone or sufficiently refractory clay did not significantly change the results.

We claim:

1. A method of making lightweight aggregate which comprises the steps of mixing a mass of divided siliceous material selected from the group consisting of clays, shales, and slates, with at least an equal volume of finely divided refractory material non-reactive to said siliceous material, heating the resulting mixture to a sufficient temperature and for a sufficient time to cause the siliceous material to bloat without substantial sticking of the refractory material thereto, the said inert refractory material filling subtantially all the voids, thus blanketing and surrounding said siliceous material during the entire step of said heating, cooling said mixture and separating said blanketing material from the bloated siliceous material, said refractory material being further characterized by softening at a higher temperature than said siliceous material.

2. The method in accordance with claim 1 wherein the siliceous material is clay.

3. The method in accordance with claim 1 wherein the siliceous material is shale.

4. The method in accordance with claim 1 wherein the siliceous material is slate.

5. A method of making lightweight aggregate which comprises the steps of reducing a siliceous material of the group consisting of clays, shales and slates to a divided state, adding a member of the group consisting of oils and tars as a bloating agent thereto and forming sized material therefrom, subjecting a mixture of said sized material with finely divided refractory material non-reactive to said siliceous material to a sufficient temperature and for a sufficient time to cause said sized material to bloat without substantial sticking of the refractory material to the said sized siliceous material, said heating being carried out while agitating said mixture and having the refractory material substantially fill all the voids between the said sized siliceous material and thus blanketing and surrounding the individual particles of said sized siliceous material during the said heating, cooling said mixture, and separating said blanketing material from the bloated siliceous material, said refractory material being present in a volume at least equal to that of said sized siliceous material and being further characterized by softening at a higher temperature than said siliceous material.

6. The method in accordance with claim 5 wherein the siliceous material is clay.

7. The method in accordance with claim 5 wherein the siliceous material is shale.

8. The method in accordance with claim 5 wherein the siliceous material is slate.

9. A method of making lightweight aggregate which comprises the steps of reducing a siliceous material of the group consisting of clays, shales, and slates to a divided state, adding a member of the group consisting of oils and tars as a bloating agent thereto and forming sized material therefrom, introducing said sized material and finely divided refractory material non-reactive to said siliceous material onto the floor of a heated chamber, plowing said sized material and refractory material to continuously effect their admixture and to substantially fill the voids between the said sized material with said refractory material and thus blanketing and surrounding each individual particle of said sized material with said inert refractory material while moving the resulting mixture across the floor of said chamber and from the chamber while heating said mixture to a sufficient temperature and for a sufficient time to cause said sized material to bloat without substantial sticking of said refractory material thereto, and separating said blanketing material from the bloated siliceous material, said refractory material being in volume at least equal to that of said sized siliceous material and being further characterized by having a softening temperature higher than that of said siliceous material.

10. The method in accordance with claim 9 wherein the siliceous material is clay.

11. The method in accordance with claim 9 wherein the siliceous material is shale.

12. The method in accordance with claim 9 wherein the siliceous material is slate.

CHARLES G. HARFORD.
EKKEHARD L. KREIDL.
JOSEPH L. UTTER.

References Cited in the file of this patent

UNITED STATES PATENTS

| Number | Name | Date |
| --- | --- | --- |
| 2,112,380 | Price | Mar. 29, 1938 |
| 2,199,946 | Evenstad | Apr. 30, 1940 |
| 2,414,734 | Gelbman | Jan. 21, 1947 |

FOREIGN PATENTS

| Number | Country | Date |
| --- | --- | --- |
| 429,015 | Great Britain | 1923 |